(No Model.)

B. S. TREADWAY.
SAW SET.

No. 261,407. Patented July 18, 1882.

Witnesses:
A. M. Long.
M. F. Halleck

Inventor.
Benjamin S. Treadway.
By Dennis L. Rogers
Atty.

N. PETERS. Photo-Lithographer, Washington, D. C.

UNITED STATES PATENT OFFICE.

BENJAMIN S. TREADWAY, OF CASENOVIA, MICHIGAN.

SAW-SET.

SPECIFICATION forming part of Letters Patent No. 261,407, dated July 18, 1882.

Application filed April 12, 1882. (No model.)

*To all whom it may concern:*

Figure 1:
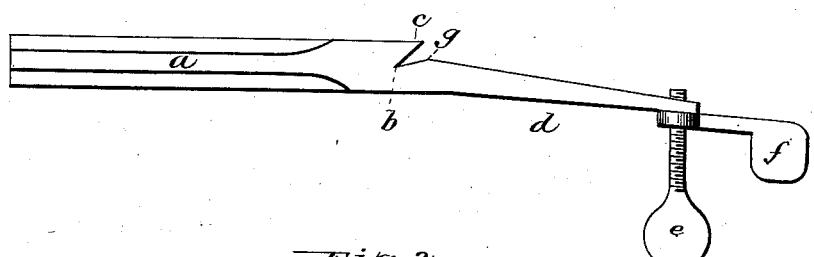
Figure 2:
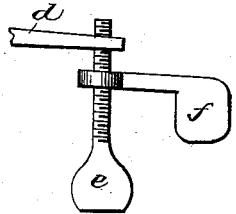

Be it known that I, BENJAMIN S. TREADWAY, of the village of Casenovia, Kent county, Michigan, have invented a new and useful Implement for Setting Saws, of which the following is a specification, reference being had to the accompanying drawings, forming part of this application, in which Figure 1 represents a side view, and Fig. 2 a detached view.

My invention consists of the implement having one of the arms, $d$, elongated and provided with a thumb-screw and set-nut, $e$ and $f$, for the purpose of forming a gage, and having at the junction of the arms a slot, $b$, the outer line of which extends upward, forming an obtuse angle with the inner line of the longer arm, as shown in the drawing at $g$, the object of which slot is to bend the point of the saw-tooth slightly when the implement is in use, as hereinafter described.

The object of the thumb set-nut $f$, which operates in the usual manner of set-nuts in all machines, is to hold the gage $e$ firmly in position when set.

To use the implement, set the gage as desired, place the implement on the saw, the point of the tooth entering the slot $b$. By a twist of the wrist bring the end of the set-screw or gage $e$ in contact with the side of the saw. Holding it firmly against it with the thumb, with a hammer or mallet tap the implement on the top at $h$. Passing up one side of the saw, treat every alternate tooth, down on the other side, those remaining, and the result will be that the teeth of the saw will be set and sharpened at the same time.

The advantages of my implement I claim to be simplicity, rapidity, and accuracy, combined with cheapness.

I am aware that it is old to provide a saw-set with jam-nuts and notches.

I am also aware that saw-sets have been made with the handle, gage-arm, and the arm that forms the binding-notch in separate pieces and held together by a sleeve; but I am not aware that the gage-arm and handle have been made in one piece and the binding-notch formed in the body. Therefore

What I claim is—

1. A saw-set having the handle and gage-arm formed in one piece and the binding-notch formed in the body thereof, substantially as described.

2. A saw-set having the handle and gage-arm formed in one piece, a binding-notch at the junction of the handle and arm, and a set-screw on the end of the gage-arm, for the purpose set forth.

BENJAMIN S. TREADWAY.

Witnesses:
DENNIS L. ROGERS,
JAY D. NAYSMITH.